Nov. 7, 1967  L. E. YEARLEY  3,351,840

DUTY CYCLE REGULATED POWER SUPPLY

Filed Feb. 15, 1965

INVENTOR
LAWRENCE E. YEARLEY
BY

ATTORNEY

United States Patent Office 3,351,840
Patented Nov. 7, 1967

3,351,840
DUTY CYCLE REGULATED POWER SUPPLY
Lawrence E. Yearley, Vista, Calif., assignor to General Precision, Inc., a corporation of Delaware
Filed Feb. 15, 1965, Ser. No. 432,564
1 Claim. (Cl. 321—45)

ABSTRACT OF THE DISCLOSURE

A regulated power supply responsive to interlaced pulses of predetermined polarity applied to a pair of inputs is provided wherein the short input pulses initiate conduction in both a transistor in the primary winding circuit of a transformer and in a silicon controlled rectifier in the circuit of a feedback winding inductively coupled to the transformer primary winding. Conduction in the transistor and silicon controlled rectifier increases until saturation in the transformer is reached and then diminishes until bias cannot sustain conduction. An elongated pulse is produced in the transformer secondary, is amplified, rectified and filtered to produce a constant, unidirectional potential.

Noise is minimized by blocking diodes in respective inputs and potential applied to transistors is limited by diodes connected between collectors and one electrode of a zener diode the other electrode of which is grounded.

---

This invention relates to an electrical power supply and more particularly to a novel and improved regulated electrical power supply consisting of a push-pull, pulse amplifier which transforms interlaced pulses into constant amplitude drive pulses used by subsequent power stages or the like.

Briefly described, this invention provides a means of deriving a constant regulated direct voltage supply with a unique push-pull amplifier. Interlaced electrical pulses are alternately applied to trigger electrodes of silicon controlled rectifiers which provide current flow to a saturable core transformer which has a feedback winding coupled back into the anode of the silicon controlled rectifier. This regenerates the silicon controlled rectifier, keeping it conducting after the initial pulse has diminished, and it will continue conducting during the saturation time of the core of the transformer. The outputs of the transformer feed a power stage transformer and the output therefrom is rectified and all the subsequent noise is filtered out which provides the constant voltage regulated power supply.

The principal object of this invention is to provide a novel and improved amplifier for developing a quasi-square wave with a variable time interval between alternate half cycles of drive power.

Figure 1:
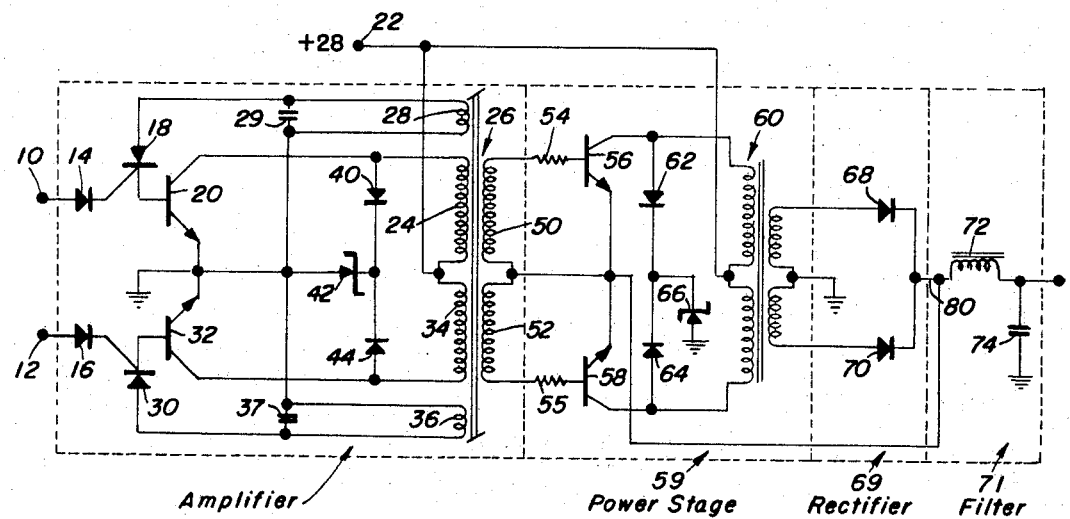
FIGURE 1 is a schematic drawing illustrating one embodiment of this invention.
Figure 2:
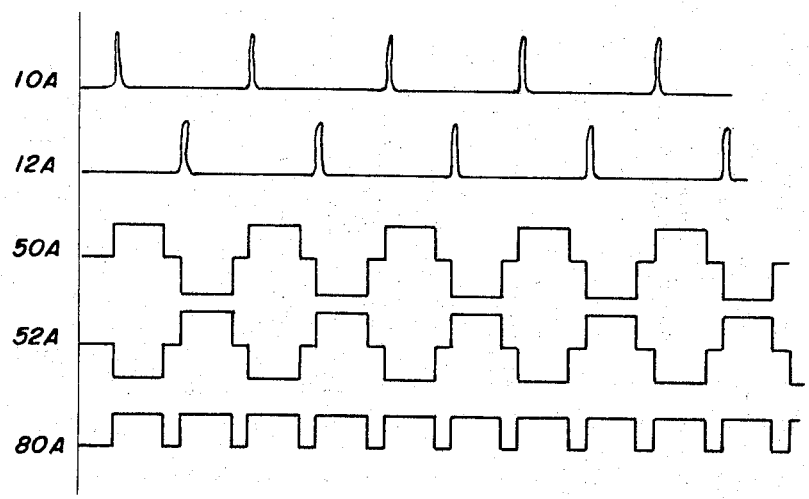
FIGURE 2 is a graphic diagram illustrating representations of the various pulses throughout the schematic drawing of FIGURE 1.

Referring now to the accompanying drawings, wherein like reference numerals indicate like or corresponding parts throughout the several views, there is shown in FIGURE 1 a pair of input terminals 10 and 12 which receive a pair of interlaced electrical signals in the form of spikes as shown in FIGURE 2 and numbered 10A and 12A to correspond to their terminal numbers. Signals of this type originate in an oscillator which produces alternate interlaced pulses and are well known in the art.

A pair of blocking diodes 14 and 16 may next be employed to limit the direction of current flow wherein diode 14 is coupled to the trigger electrode of a silicon controlled rectifier 18; therefore, signals on the input terminal 10 are used to trigger the silicon controlled rectifier conducting. This signal is also simultaneously applied to the base of transistor 20 rendering it conductive and causing current to flow from a +28 voltage supply designated by the numeral 22 through the primary winding 24 of a saturable core transformer 26. A saturable core transformer 26 will begin saturating causing an induced current flow into the feedback winding 28, causing current to flow into the anode of the silicon controlled rectifier 18 and subsequently keeping the silicon controlled rectifier 18 conducting even though the oscillator signal on terminal 10 has diminished. Capacitor 29 suppresses voltage transients which would cause triggering of the silicon controlled rectifier 18. Current will continue flowing in the feedback winding 28 due to transistor 20 conducting and cause the silicon controlled rectifier to "lock on." When the core of transformer 26 is completely saturated, the voltage induced by transformer 26 diminishes, reducing the drive signal to transistor 20. The reduced drive signal allows transistor 20 to cease conducting. Diminishing current in winding 24 induces voltage of the opposite polarity which appears on the anode of the silicon controlled rectifier 18, turning it off, and, as is inherent with this type of component, it will not conduct again until a signal is received on its trigger electrode. At this time the silicon controlled rectifier 18 will operate as a blocking diode and prevent current from flowing into the base of transistor 20.

An alternate pulse is now applied to the terminal 12 and to the trigger electrode of the silicon controlled rectifier 30 rendering it conductive. The alternate pulse is interlaced as previously mentioned with the signal on terminal 10 and is illustrated by the graph 12A of FIGURE 2. This pulse is also applied to the base of transistor 32, rendering this component conductive. Current will now flow from the terminal 22 through the primary winding 34 of the transformer 26. A voltage is induced into the feedback winding 36 and likewise again locking on the silicon controlled rectifier 30.

A means of limiting the voltage applied to the transistors 20 and 32 is provided by the diodes 40, 42 and 44. The diode 42 has a specific backbiased zener voltage which provides that any voltage over the specific zener voltage will be conducted to ground. Other means could be employed or a lower voltage on terminal 22 may be used, thereby allowing the diodes 40, 42 and 44 to be eliminated.

Outputs from the transformer 26 are taken from a pair of secondary windings and signals produced therefrom are in the form of three-stage quasi-square wave forms of opposite polarities with a pulse duration time equal to the saturation time of the saturable core of transformer 26. These signals are illustrated by the graphs 50A and 52A in FIGURE 2.

Transformer output winding 50 has one end thereof coupled to the base of a transistor 56 through a current limiting resistor 54. The other end of the secondary winding 52 is coupled through the limiting resistor 55 to the base of transistor 58. A center tap between the secondary windings 50 and 52 is coupled to the emitters of both transistors 56 and 58. The collectors of transistors 56 and 58 are coupled to the primary windings of a power stage transformer 60, which has a center tap on the primary windings coupled directly to the terminal 22 and the 28 volt power supply. Diodes 62, 64 and 66 are again provided to limit the voltage applied to the collectors of transistors 56, 58 by coupling the anodes of diode 62 to the collector of transistor 56, and the anode of diode 64 to the collector of transistor 58, and coupled in the anodes from diodes 62 and 64 directly into the cathode of diode 66 which has a specific zener voltage and the anode of diode 66 coupled to ground.

The secondary winding of the transformer 60 is coupled to a pair of rectifier diodes 68 and 70, and the outputs therefrom are coupled together into a filter formed of the inductor 72 and the capacitor 74. The output of the rectifier before it is presented to the filter at point on the lead numeral 80 is illustrated in the graph 80A of FIGURE 2. The filter 71 removes all of the return-to-zero spikes presenting the constant current output.

The power stage 59, the rectifier 69, and the filter 71 are illustrative of one particular power stage that can be used with this invention. Obviously, other modifications such as different types of power stages, etc., can be added to this invention without departing from the spirit and scope as set forth in the appended claim.

What is claimed is:

A regulated electrical power supply including a push-pull amplifier comprising a first input path and a second input path each having unidirectionally conducting means interposed therein and adapted to receive and pass alternately interlaced electrical signals of a predetermined polarity, first and second silicon controlled rectifiers each having an anode, a cathode, and a control element connected to said unidirectional devices and alternately enabled by said interlaced pulses, first and second transistors each having an emitter, a collector and a base, a saturable core transformer having a center tapped primary winding and respective ends of said primary winding connected to collector electrodes of said transistors, the emitter electrodes of said transistors being connected to ground and the bases of said transistors being connected to respective cathodes of said silicon controlled rectifiers, said transformer having a pair of feedback windings each having one end grounded and the other ends of said feedback windings being connected to respective anodes of said silicon controlled rectifiers, a further pair of unidirectional devices having anodes connected to respective collectors of said transistors and cathodes connected together, a zener type diode having a cathode connected to the cathodes of said further pair of unidirectional devices and an anode connected to ground, said transformer having a secondary winding coupled to push-pull power amplifier means, rectifier and filter means coupled to said power amplifier means.

References Cited
UNITED STATES PATENTS

| | | | |
|---|---|---|---|
| 3,030,589 | 4/1962 | Kadri | 331—113.1 |
| 3,219,906 | 11/1965 | Keller et al. | 321—45 |
| 3,222,618 | 12/1965 | Ressler | 321—2 XR |
| 3,267,349 | 8/1966 | Krause | 321—2 XR |
| 3,305,760 | 2/1967 | Davis et al. | 321—45 |

JOHN F. COUCH, *Primary Examiner.*

WM. SHOOP, *Assistant Examiner.*